March 11, 1969 L. W. MADER 3,432,673

LINE TRACKING READING MACHINE HAVING MEANS TO POSITIONALLY NORMALIZE THE CHARACTER-VIDEO SIGNALS

Filed Oct. 6, 1967 Sheet 1 of 2

INVENTOR

LYLE W MADER

BY Joseph A. Genovese

ATTORNEY

March 11, 1969 L. W. MADER 3,432,673
LINE TRACKING READING MACHINE HAVING MEANS TO POSITIONALLY NORMALIZE THE CHARACTER-VIDEO SIGNALS
Filed Oct. 6, 1967
Sheet 2 of 2

INVENTOR
Lyle Mader

BY Joseph A. Genovese

ATTORNEY

United States Patent Office 3,432,673

Patented Mar. 11, 1969

3,432,673

LINE TRACKING READING MACHINE HAVING MEANS TO POSITIONALLY NORMALIZE THE CHARACTER-VIDEO SIGNALS

Lyle W. Mader, Olney, Md., assignor to Control Data Corporation, Rockville, Md.

Filed Oct. 6, 1967, Ser. No. 673,314

U.S. Cl. 250—219 9 Claims

Int. Cl. G01n 21/30

ABSTRACT OF THE DISCLOSURE

An optical character reading machine having a scanner whose field of view is appreciably taller than the vertical size of a line of print to provide large vertical registration tolerance and to enable the machine to scan severely skewed lines of print. A simple, high speed logic network positionally normalizes the character-video signals of the scanner so that the machine disregards substantially all of the signals originating from the field of view except those pertaining to the characters. The logic network positionally normalizes the video signals at exceptionally high speed in comparison to prior normalizing techniques.

This invention relates to optical character reading machines and particularly to the problem of vertical registration of the character images with the scanner or other photosensitive portion of the reading machine.

The requirement for registering each character to be read with the scanner of a reading machine presents one of the more difficult problems in the art at this time. Since images of the characters are ordinarily moved in a direction parallel to the line of printed characters, horizontal registration is easily obtained. Registration in a direction normal to the character image motion ("vertical" registration) is difficult.

The necessity for vertical registration is obvious. If a character only partially comes into the field of view of the scanner, it is only partially examined. Most of the time such a misregistered character will be rejected, but sometimes it will be erroneously identified. For example, in some fonts if the top of a "9" is clipped, the machine has no alternative but to identify it as a "4." This is an obvious consequence of vertical misregistration. There are many subtle consequences, some of which are discussed below in connection with selected prior efforts to obtain vertical registration in optical character reading machines.

Rabinow Patent No. 3,142,761 discloses a scanner made of a column of photocells with sections of them at the ends of the column used to develop servo correction signals. These signals are used to adjust the vertical position of the scanner with respect to the line of characters being read. This system is very slow as servo correction requires a mechanism to cause movement of the scanner or the document.

Another mechanical approach to the vertical registration problem is disclosed in the Rabinow Patent No. 3,264,469. A high speed mirror is in the optical path between the document and the scanner photocells. The mirror sweeps the character images vertically at a high speed as the images move horizontally at a lower speed due to document movement. There are several drawbacks with this system, for instance, reading rate is limited by the speed of the mirror and both the mirror and the shift register (character image register) of the machine must operate at very high speeds to obtain reasonable resolution. While this system is satisfactory for low reading rates, e.g. of the order of 500 characters per second, it cannot be used for reading rates much in excess of that.

It became evident a long time ago that the vertical registration problem should be solved by electronic means in view of the inherent speed thereof in comparison to mechanical devices.

The Rabinow et al. Patent No. 3,104,369 discloses a reading machine which does this. A tall area is scanned and the scan-extracted video signals are gated into an image (shift) register. Thereafter the video signals are shifted to a predetermined position in the register to coincide with prewired character criteria. This is much faster than the mechanical system, but is limited in speed to that of the register (a shift register with its steering circuits is one of the slower of the conventional computer logic components). However, this system proved unreliable in the presence of optical blemishes on the document. The Holt Patent No. 3,104,371 discloses a way to at least partially cope with the blemish or dirt problem. In any event, both the Holt and Rabinow et al. systems require considerable hardware as their image registers must correspond in capacity to the height resolution of the scanner. Each of these patented systems is limited in speed to that of the register.

Rabinow Patents Nos. 3,104,369 and 3,201,751 disclose multiple parallel sets of character standards, e.g. resistor adders. The sets are arranged to correspond to slight vertical displacement positions which the scanned character may occupy. This system is a simple, brute force method which is inordinately expensive as each character criterion displacement can be no greater than a fraction of the line thickness of a character. This means that a large number of sets of criteria are necessary for any appreciable amount of vertical tolerance.

The Rabinow Patent No. 3,271,740 discloses an image converter tube used to vertically servo the character image position and/or to vertically oscillate the image as it moves horizontally at a slower speed past a scanner. In theory, this system is good, however, practical use in optical character recognition awaits a "better" image converter tube. Experimental efforts with the system were satisfactory at slow speeds only. Distortions and irregularity of light on the face of the tube at high speeds were unsatisfactory.

A further effort toward overcoming the vertical registration problem is disclosed in the Rabinow Patent No. 3,179,923. To cover a tall area, a scanning disc is used with three adjacent optical systems having a field of view which is the composite of the three. The scanner-extracted video signals are compressed, and if the entire resolution capacity of the machine is used, the video signals must be unscrambled to eliminate the tear in the video image which occurs when the image bridges adjacent optical systems. Here again, this system is limited in speed to that of the image register and requires complex and slow unscrambling logic.

The preceding discussion of vertical registration can be summarized as follows. For a single character, it is obvious that unacceptable results will be obtained if the character image is only partly registered with the scanner prior to a machine-attempt to identify the character. Mere vertical enlargement of the field of view of the scanner is not totally satisfactory, because of the additional cost and taxing of the speed of the machine. The same is true of parallel multiple character criteria. Efforts to recover the speed are at the expense of additional cost. Mechanical and/or electronic means for vertically oscillating the character image while it is horizontally displaced are not completely satisfactory particularly at high reading rates. The above observations apply to reading on a character-for-character basis. Fortunately the majority of machine reading tasks involve reading lines of print. In most instances vertical registration of the first character of a line will mean that all characters of that line will be similarly registered with the scanner. This leaves the problem of registering the first character of a line and also leaves the problems encountered when the line of print is skewed on the paper and/or the paper is skewed by the document feeder and transport of the reading machine. Also left is the occasionally occurring problem where only one or a few characters are printed out of vertical register within the line as by a poorly adjusted typewriter or printer.

Accordingly it is evident that one can rely upon the fact that lines of print are generally printed horizontally, but yet for optimum results a reading machine must be designed for characters which are vertically displaced from the vertical position occupied by the adjacent characters of a line.

An object of this invention is to provide a reading machine with means for overcoming the vertical registration difficulties in a manner such that the reading speed of the machine is so little affected as to be negligible, and such that the cost of necessary additional circuits is small.

Another object of this invention is to provide a reading machine with large vertical registration tolerance without suffering many of the adverse consequences of prior devices and circuits to accomplish a similar result.

In practice of the invention the field of view of the character-image examining device, usually a scanner, is vertically larger than the characters, for example, two, three, four or more times as large as the character height. This presupposes a tall column of photocells, a large vertical excursion of a flying spot (no matter how generated), etc. In addition, the invention relies upon control signals which are functionally analogous to those which are obtained from a conventional prescanner indicating the vertical position of the character image on the scanner for each character or plurality of characters of a line of print. The control signals prescribe the passage of the scanner outputs (called video signals) through a logic network in a tree configuration having the effect of compressing the field of view to exclude the vertical portions which are unoccupied by the character. Another way to express this is that the character-defining video signals are positionally normalized, i.e. re-located to a predetermined vertical position. With respect to the document, the video signals are spatially normalized. The result is that the main memory of the reading machine, often a shift register called an image register, need have a vertical capacity only equal to the height of the character image.

There are important features in the above. First, the logic network also referred to herein as positioning logic, is composed primarily of logic gating which differs from the customary use of the shift for a similar purpose, e.g. as in Patent No. 3,104,369. The logic network is not subject to the optical dirt problem discussed in that patent and it is considerably faster than a shift register. Commercially available registers of a few megacycles rate are considered very fast, while the speed of gates is hardly measurable being the same as the rise time of a few diodes (when diode gates are used). Secondly, the above logic network is said to rely upon control signals like those which can be made available from a conventional prescanner, e.g. as in Patent No. 3,104,369. The instant invention can use a true prescanner, i.e. a separate scanner section located ahead of the information scanner section to obtain signals which signify the vertical position of the characters which are scanned immediately thereafter by the information scanner section. However, a feature of the invention is the use of a single scanner which provides both the video signals and the logic network control signals. In reading lines of print the inherent speed of the gating in the positioning logic network is partially responsible for making this possible. The advantage of using a single scanner with the composite sections for both control and information-extraction is best exemplified by considering a scanner made of a single column of photocells. A prescanner section and separate information scanner section each having eighty photocells will have a field of view corresponding to eighty photocells. If the scanner and prescanner are end-to-end vertically in a single scanner configuration, the field of view is vertically doubled.

A further object of the invention is to provide a reading machine with a large tolerance for vertical registration of character images with the scanner arranged alternately in any of the forms substantially as described above.

Other objects and features will become evident in following the description of the illustrated forms of the invention which are given by way of example only.

Figures 1, 3:
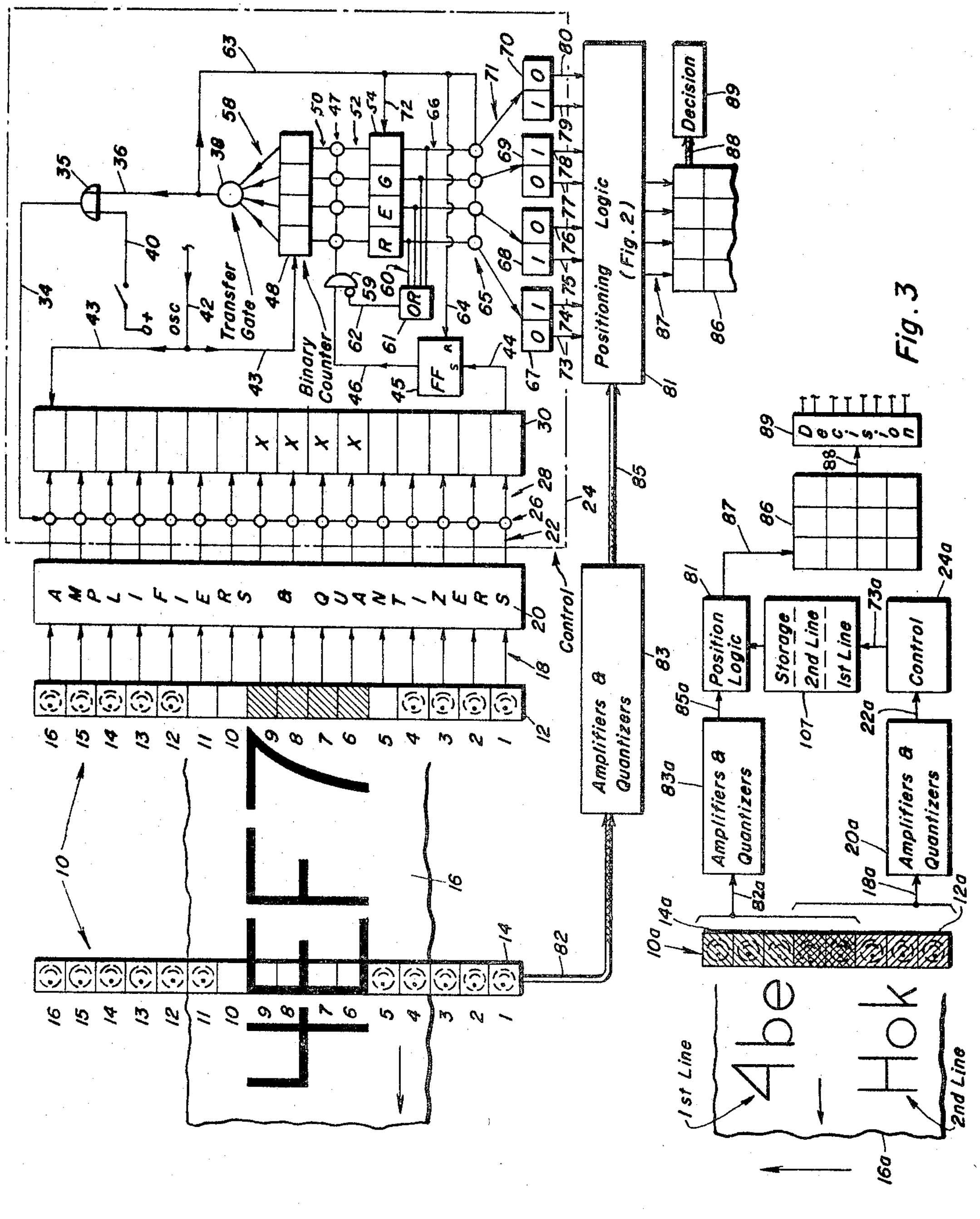
FIGURE 1 is a schematic view showing one form of the invention connected with fragments of a reading machine.
FIGURE 3 is a schematic view showing another embodiment of the invention.
Figure 2:
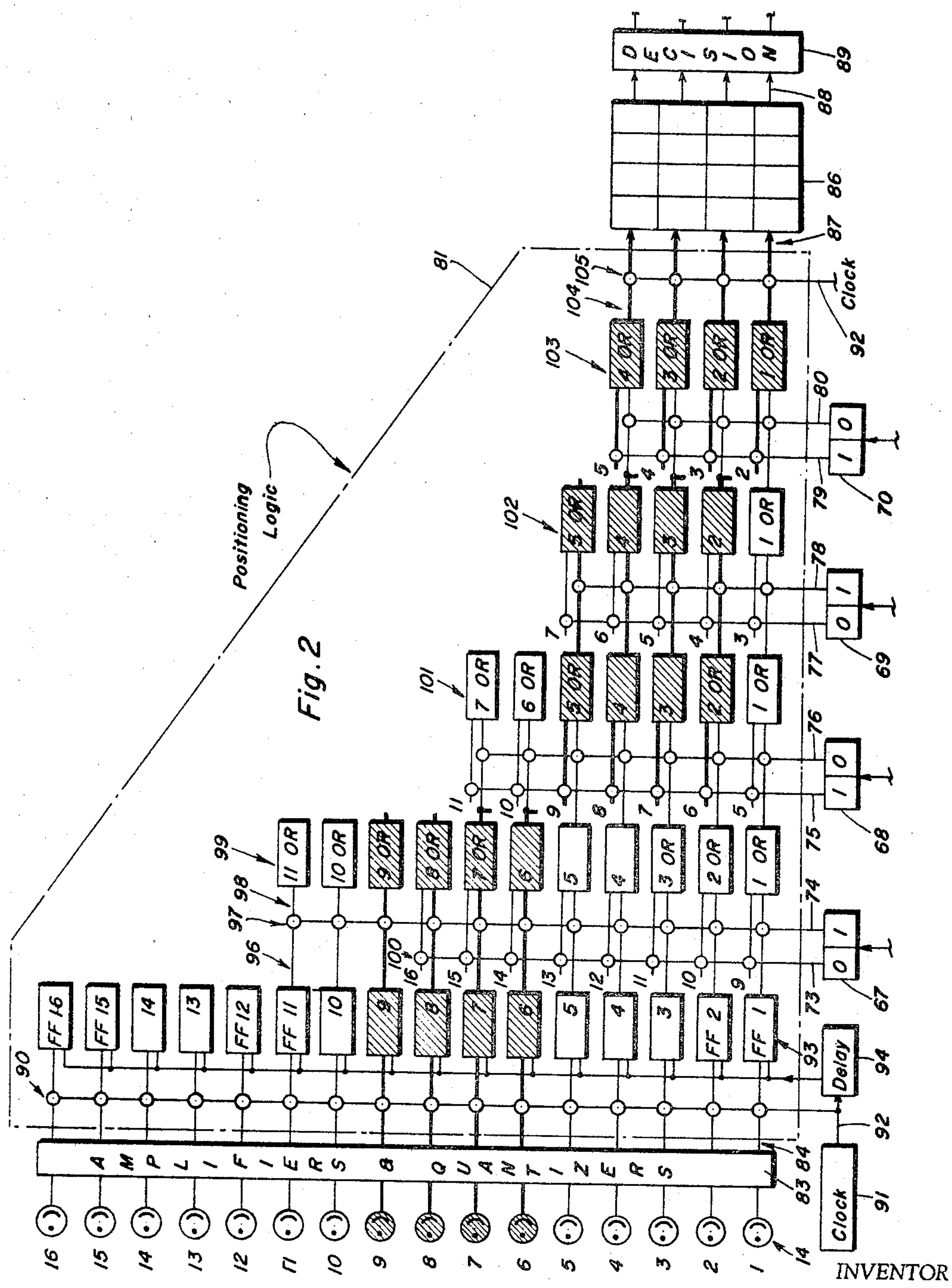
FIGURE 2 is a schematic view showing the positioning logic network in FIGURE 1.

In the drawings, FIGURES 1 and 3 show two embodiments of the invention, while FIGURE 2 shows the details of a positioning logic network used in both embodiments. The major difference between the embodiments of FIGURES 1 and 3 is in the physical arrangement of scanners. In FIGURE 1, scanner 10 is in two columnar photocell sections 12 and 14. Section 12 performs a prescan function while section 14 extracts video signals from document 16 for character recognition. In FIGURE 3 scanner 10*a* is in two sections 12 and 14*a* and they function the same as sections 12 and 14. The distinction is that sections 12 and 14 are physically separate while sections 12*a* and 14*a* are arranged as a single column of photocells with the center cells performing the dual function of providing both character position and video signals. Unshown is an obvious third alternative where sections 12 and 14 (or 12*a* and 14*a*) are placed in tandem with none of the photocells serving a dual purpose.

For the sole reason that the invention is more readily explained and exemplified by FIGURE 1, this embodiment is described first and shown in more detail than FIGURE 3. Conventional reading machine subassemblies forming the background for the invention are only superficially treated. Disclosures of complete reading machines with which the invention may be used, are found in numerous prior patents such as 3,104,369 and 2,897,481 and others. Again for simplicity only, the setting of the invention is with a reading machine like that described in Patent No. 3,104,369 where the scanner is a column of photocells. The scanner outputs are amplified, quantized and gated into a shift (image) register. Prewired character criteria or standards made of resistor adders are connected with the shift register, and a comparator examines (for each scanned character) the outputs of the resistor adders to identify the character.

As shown in FIGURE 1, section 12 of scanner 10 first examines the line of print on document 16 (by examining the image thereof formed by an optical system which is not shown). The photocells at the numbered vertical positions 1–16 provide signals on lines 18 which are amplified and quantized at 20 to provide "black" and "white" video signals on lines 22. These enter control circuitry 24 as inputs to coincidence gates 26 whose outputs on lines 28 are conducted in parallel to a high speed shift register 30. Gates 26 are interrogated (strobed) by signals on line 34 from OR gate 35 whose inputs are on line 36 from the transfer AND gate 38 or a start signal line 40 which are described later.

As the image of the line of printed characters passes scanner section 12, the photocells at positions 6–9 provide "black" signifying signals while all of the other photocells provide "white" signifying signals. When gated into register 30, e.g., by a gate 26 enable pulse manually provided on line 40, the stages corresponding to photocell positions 6–9 are set to signify "black" and all others remain (or are reset) in the "white" signifying condition.

From this point in the description, the purpose of the control circuitry 24 is to determine the position (cell positions 6–9) of the "black" video and develop and store control signals reflecting that position. To accomplish this a free running oscillator provides signals on lines 42 and 43 which step register 30 to shift its stored information over line 44 to flip flop 45. When the first "black" signifying video bit reaches the flip flop it sets the same to provide a signal on line 46 which is impressed upon all of the AND gates of set 47. As shown in the example of FIGURE 1, the flip flop 45 will be set on the fifth shift of register 30.

While register 30 is being stepped, binary counter 48 is simultaneously stepped by the oscillator signals on lines 42 and 43. Consistent with the illustrated example, counter 48 is a four place binary counter (count of 16). Accordingly, on the count of "5" (five steps of register 30 brings the lowermost "black" bit to the bottom to set flip flop 45), counter 48 will have stepped to the count of 5 which is 0101. That binary number is conducted over lines 50, passed by gates 47 which are enabled by the flip flop signal on line 46, and stored in register 54 via lines 52. The desired control signal 0101 is now in storage register 54 while the counter 48 continues to be cycled to a count of 16 (1111). Upon reaching that count signals on the four lines 58 from counter 48 provide coincidence at the transfer AND gate 38 thereby producing a new transfer signal on line 36. This signal passes through gate 35 on to line 34 and allows a new set of video signals to be entered into register 30 via gates 26. The cycle which develops a control signal to be stored in register 54 begins again. However, prior to this certain other things take place in the control circuits 24.

After the first "black" video bit shifts to the bottom of register 30 and sets flip flop 45 and the binary number (0101 in the example) is stored in register 54, the flip flop output on line 46 is inhibited by inhibit gate 59 in line 46 for the duration of the completion of the cycle of counter 48. To accomplish this, the inhibit signal for gate 59 is obtained from one or more of the register output lines 66 by way of lines 60, OR gate 61 and inhibit signal line 62 which is the output line of OR gate 61. As established before, upon reaching a count of 1111, counter 48 provides outputs on lines 58 resulting in a signal on line 36 from transfer gate 38. In addition to its transfer function this signal is conducted over lines 63 and 64 to reset the flip flop 45. It also provides an enable signal for the set 65 of AND gates whose other inputs are conducted from register 54 over lines 66. Thus the binary number stored in register 54 is transferred to the set of four binary flip flops 67, 68, 69 and 70 via gate output lines 71. The transfer signal fed back on lines 63 and 72 is also used to clear register 54. The binary flip flops have respective pairs of output lines 73 and 74, 75 and 76, 77 and 78, 79 and 80, one line of each pair providing a signal depending on the state of its flip flop. Binary flip flops 67, 68, 69 and 70 are shown in FIGURES 1 and 2 thereby correlating these figures. The signals on lines 73 . . . 80 are control signals for the positioning logic network 81 shown in both of these figures.

Section 14 of scanner 10 is constructed like section 12 but is horizotnally displaced from it a short distance. The conductors from the photocells are in cable 82 and these are connected with amplifiers and quantizers 83 to provide quantized video signals on lines 84 (FIGURE 2) of cable 85 (FIGURE 1). Conductors 84 impress the video signals on network 81 which positionally normalizes the video signals pertaining to the scanned character (the letter E in FIGURE 1) to a predetermined location for storage in image register 86 via lines 87. The accomplishment of network 81 functioning under the control of the signals on lines 73 . . . 80 of control circuits 24, is to select the character video from the tall field of view of scanner section 14 no matter where vertically located, and to normalize its vertical position to match the register 86. In a sense, the effect is to compress the scanner field of view to the character area by excluding the unwanted vertical parts of the area, and to position the desired video signals to match the location of the register input lines 87. Thus, the register 86 requires a vertical capacity no greater than that to match the tallest character. As stated before, the reading machine need not be of the type using an image register in which case the normalized video signals will be used with other recognition logic (not shown but see for example Patent No. 2,897,481 or 3,142,818). When used with an image register machine, e.g., Patent No. 3,104,369, the character standards and comparators are operatively connected with the register as represented herein by cable 88 and decision 89.

Network 81 is constructed and operates as follows. The video signals of the full vertical field are conducted on lines 84 to a set of AND gates 90 which are strobed by signals on line 92 from the main clock 91 of the machine. The clock frequency is a function of the speed of horizontal motion of the images of the line of print. The video signals (both "black" and "white" signifying) pass gates 90 and are used to set (or fail to set) a group 95 of flip flops, there being one for each photocell position of scanner section 14. All of the flip flops are cleared immediately after each clock pulse by very briefly delaying, as at 94, the gate enabling clock pulse and conducting it over line 95 to the reset terminals of the flip flops.

FIGURE 2 shows the photocells at positions 6–9 darkened to preserve the reading example of FIGURE 1. Also the path of the desired video signals through network 81 is indicated by similarly darkened logic elements and conductors. The numerical designations 1–16 on the conductors and logic elements correspond to the photocell positions of scanner section 14. Accordingly, it is seen that the character-defining video is conducted on four of the output lines 96 from flip flops 6–9 and impressed upon four of the sets 97 of AND gates whose inputs are from flip flops 1–11. The gate enable signal for this set of gates is obtained from the line 74 of binary flip flop 67. Four of the gate output lines 98 conduct the desired video signals to OR gates 6–9 of the group 99 of eleven OR gates. As shown, in addition to AND gates 97 there is a second set 100 of AND gates to which flip flops 9–16 are connected. These gates are enabled by a control signal on line 73 of binary flip flop 67, and their outputs (there are none in our example) are conducted to OR gates 99 at positions 1–8.

At this point it becomes obvious that the AND-OR gating of network 81 is in a tree configuration with each transfer level governed by control signals from the binary flip flops 67–70. The transfer of information from the set of OR gates 99 to the set 101 of OR gates and from OR gates 101 to OR gates 102 and then to OR gates 103 is now considered obvious in FIGURE 2. Each of the binary flip flops 67 . . . 70 has its pair of conductors connected to enable one or the other of two sets of AND gates whose other inputs are obtained from folded groups of output lines from the preceding OR gates. The outputs on lines 104 of the final set 103 of OR gates are gated at 105 with the clock signals on line 92 to retain the necessary synchronism between horizontal image motion of the characters and the loadings of register 86 over lines 87.

Attention is directed to the embodiment of FIGURE 3 which differs only slightly from FIGURE 1. Scanner **10*a* has two sections 12*a* and 14*a* vertically in tandem with photocells at the center positions serving as parts of both sections. Obviously, for the same number of photocells in the scanners 10 and 10*a*, the latter will provide a much taller field of view. However, an additional stage 107 of storage is required. Otherwise the embodiments of FIGURES 1 and 3 are identical. This being the case, cable 18a is shown connected to amplifiers and quantizers 20a. Cable 22a connects the quantizers with control circuitry 24a whose output lines 73a conduct the control signals to a storage device 107**, e.g., a set of flip flops, a core (or other) register, etc.

The information section 14a of the scanner conducts the video signals over cable 82a to amplifiers and quantizers 83a whence they are conducted over cable 85a to positioning logic network 81 under the control of the signals on lines 73a (from binary flip flops 67 . . . 70) maintained in storage 107.

Operation of the embodiment of FIGURE 1 has been described in detail. From a reading task standpoint, however, scanner section 12 (and the circuits following it) note and store control signals pertaining to the vertical position of the line of print. Section 14 extracts the video signals from the line of print, and the desired video signals (those pertaining to the characters) are positioned to match the register 86 (or for other purposes) as required by the control signals. The only difference in the operation of the FIGURE 3 embodiment is that the first line (or line fragment) of print is scanned by section 12a and the control signals for a line are stored at 107. Meanwhile or thereafter the document 16a is moved vertically ("up" as shown) a predetermined distance so that the horizontal motion of the image of the document will sweep the first line of print over the scanner section 14a while the second line is examined by scanner section 12a. During examination of the first line by section 14a, the positional control signals for the first line are withdrawn from storage 107 and used with position logic network 81 as described. Simultaneously, control signals for the second line are developed for storage at 107 and for use with the second line during the scanning by section 12a of the third line of print (not shown).

Numerous changes may be made without departing from the scope of the following claims.

What is claimed is:

1. In a reading machine, a scanner having a field of view to examine an area vertically larger than a line of characters and having means to extract video signals corresponding to the characters and their background on the area, means responsive to said video signals for detecting the vertical position of a portion of the line in said field of view, means for storing information indicating said vertical position, means responsive to said stored information for providing control signals, a positioning logic network responsive to said control signals for positionally normalizing video signals extracted from said area, and means to identify a character of the line on the basis of the positionally normalized video signals.

2. The reading machine of claim 1 wherein said vertical position detecting means include a counter and coincidence means, means for conducting said video signals to said coincidence means, and means to conduct the counter outputs thereto so that said coincidence means respond upon presentation of a video signal relating to a character and a count output of the counter.

3. The reading machine of claim 2 wherein said positioning logic network includes sets of gates with the sets arranged in a tree configuration.

4. The subject matter of claim 3 means for impressing said control signals on said sets of gates as enabling signals to direct the video signals through said sets of gates in the tree configuration.

5. The reading machine of claim 1 wherein said scanner examines the area in individual scan lines transverse of the line of characters, said detecting means including coincidence gating means and a counter, means to conduct the video signals originating from the scanning of the area by a scan line, to said gating means, means to conduct the count outputs of said counter to said gating means, means to synchronize the counter with the video signals reaching said gating means so that coincidence at said gating means results in a count of said counter which signifies the vertical position within a scan line at which the video signals occurred and thereby provides the said information defining the vertical position of a portion of the line of characters in said field of view.

6. The reading machine of claim 5 wherein said position logic networks includes sets of gates arranged in a tree configuration, and means for impressing said control signals on said said sets of gates for positionally normalizing the video signals in accordance with the said vertical position information from which said control signals were developed.

7. In an optical character reading machine for lines of characters, a scanner having a first section including means adapted to provide first signals while scanning a line of characters, means responsive to said first signals for providing control signals which signify the vertical position of the line of characters with respect to said first section including means, said scanner having a second section including means adapted to provide video signals while scanning the line of characters, a positioning logic network, means for conducting said video signals into said positioning logic network, and means for impressing said control signals on said logic network to positionally normalize the video signals in accordance with said control signals.

8. The subject matter of claim 7 wherein said positioning logic network comprises sets of gates in a tree configuration, and said control signals are impressed thereon at the tree levels of said network.

9. The subject matter of claim 8 wherein said control signal providing means include a counter for the video signals of a scan by said first scanner section, storage means operatively connected with said counter to store binary signals corresponding to the control signals, and means responsive to the storage of said binary signals for providing a transfer signal which initiates the acceptance by said counter of video signals of another scan by said first scanner section.

References Cited

UNITED STATES PATENTS

| | | | |
|---|---|---|---|
| 3,289,164 | 11/1966 | Rabinow | 340—146.3 |
| 3,295,104 | 12/1966 | Gray et al. | 340—146.3 |
| 3,348,200 | 10/1967 | Ross | 340—146.3 |
| 3,350,545 | 10/1967 | Street | 250—219 |
| 3,382,482 | 5/1968 | Greenly | 340—146.3 |

OTHER REFERENCES

Demer, F. M., OCR Vertical Registration System, IBM Technical Disclosure Bulletin, vol. 9, No. 10, March 1967, pp. 1367.

Otto, W. B. et al., High-Speed Registration for Position Code Scanning, IBM Technical Disclosure Bulletin, vol. 9, No. 11, April 1967, pp. 1593.

RALPH G. NILSON, *Primary Examiner.*

BRUCE L. ADAMS, *Assistant Examiner.*

U.S. Cl. X.R.

340—146.3; 250—209